United States Patent
Funaki

[19]

[11] Patent Number: 5,598,561
[45] Date of Patent: Jan. 28, 1997

[54] OPTIMIZING COMPILER WHICH GENERATES MULTIPLE INSTRUCTION STREAMS TO BE EXECUTED IN PARALLEL

[75] Inventor: Hiroshi Funaki, Tokyo, Japan

[73] Assignee: NEC Corporation, Tokyo, Japan

[21] Appl. No.: 918,032

[22] Filed: Jul. 24, 1992

[30] Foreign Application Priority Data

Jul. 25, 1991 [JP] Japan .................................. 3-207152

[51] Int. Cl.$^6$ .................................................. G06F 9/45
[52] U.S. Cl. .................................. 395/706; 395/709
[58] Field of Search .................................. 395/700, 650

[56] References Cited

U.S. PATENT DOCUMENTS

| | | | |
|---|---|---|---|
| 4,667,290 | 5/1987 | Goss et al. | 395/700 |
| 4,885,684 | 12/1989 | Austin et al. | 395/650 |
| 4,914,584 | 4/1990 | Gibson | 395/375 |
| 5,021,947 | 6/1991 | Campbell et al. | 395/375 |
| 5,088,034 | 2/1992 | Ihara et al. | 395/700 |
| 5,151,991 | 9/1992 | Iwasawa et al. | 395/700 |
| 5,230,050 | 7/1993 | Iitsuka et al. | 395/700 |
| 5,230,053 | 7/1993 | Zaiki | 395/700 |
| 5,278,986 | 1/1994 | Jourdeirais et al. | 395/700 |
| 5,293,631 | 3/1994 | Rau et al. | 395/700 |
| 5,317,743 | 5/1994 | Imai et al. | 395/700 |
| 5,404,531 | 4/1995 | Wakatani | 395/700 |
| 5,442,790 | 8/1995 | Nosenchuck | 395/700 |
| 5,452,461 | 9/1995 | Umekita et al. | 395/700 |
| 5,481,723 | 1/1996 | Harris et al. | 395/700 |

*Primary Examiner*—Kevin A. Kriess
*Assistant Examiner*—John Q. Chavis
*Attorney, Agent, or Firm*—Foley & Lardner

[57] ABSTRACT

In a compiler which produces an object program from a source program, the automatic parallelization unit is comprised of the parallelizing intermediate code detection unit which detects an intermediate code convertible to other intermediate codes each providing the same result of operation but cannot be determined as to whether the execution of one of the intermediate codes will terminate more quickly than the others without being executed, and the intermediate code parallelizing conversion unit which converts to an intermediate code that executes the converted intermediate code and the original intermediate code in parallel, stops the execution of the other intermediate codes when one of them has terminated execution before the other, and executes return to the original execution control.

4 Claims, 6 Drawing Sheets

FIG. 3

EXPLANATIONS OF INTERMEDIATE CODES

PARADO   M, L  ———————————— 31

PRAKIL   M  ——————————————— 32

VECMOV   B, FB, SB, A, FA, SA, LA  —— 33

DOLOP   H, L  ———————————— 34

GOTO   L  ———————————————— 35

MOV   B, A  ————————————— 36

ENTRY   SUB  —————————————— 37

RETURN  ————————————————— 38

FIG. 5

AN EXAMPLE OF OUTPUTS OF INTERMEDIATE CODE 14

```
       PARADO    M2, L2 ————————————— 51
       MOV       J, 1        ┐
       DOLOP     1000, L1    │ 42
   L1  VECMOV    B, J*20 - 19, 1, B, J*20 - 19, 1, 20 ┘
       PRAKIL    M2 ———————————————— 52
       GOTO      L4 ———————————————— 53
   L2  MOV       I, 1        ┐
       DOLOP     20, L3      │ 43
   L3  VECMOV    B, I, 200, A, I, 200, 100 ┘
       PRAKIL    M1 ———————————————— 52
   L4  MOV       J, 1000
       MOV       I, 20
       . . . . . .
```

FIG. 4

AN EXAMPLE OF FORTRAN PROGRAM

```
            ┌─ 41
DIMENSION  A( 20, 1000 ) , B( 20, 1000 )
DO  10  J = 1, 1000, 10
     DO   20  I = 1, 20
          B ( I, J ) = A ( I, J )
20 CONTINUE
10 CONTINUE
```

↓ INTERMEDIATE CODE 42 CORRESPONDING TO PROGRAM 41

```
DOLOP    100, L
VECMOV   B, J*20 - 19, 1
         A, J*20 - 19, 1, 20
```

CONVERSION ↓

```
              ┌─ 43
DOLOP    20, L
VECMOV   B, I, 200
         A, I, 200, 100
```

↓ PROGRAM 44 CORRESPONDING TO CONVERTED INTERMEDIATE CODE 43

```
DIMENSION  A( 20, 1000 ) , B( 20, 1000 )
DO  10  I = 1, 20
     DO   20  J = 1, 1000, 10
          B ( I, J ) = A ( I, J )
20 CONTINUE
10 CONTINUE
```

FIG. 6

SECOND EXAMPLE OF OUTPUTS OF INTERMEDIATE CODE 14

```
     DO 10 I = 1, N
        B(I) = A(I)
  10 CONTINUE
```

```
        PARADO   M2, L1  ──────────── 63
        MOV      I, 1          ┐
        DOLOP    N, L2         │
        MOV      A(I), B(I)    ├── 62
   L2   ADD      I, 1          ┘
        PRAKIL   M2    ──────────── 64
        GOTO     L3    ──────────── 65
   L1   VECMOV   B, 1, 1, A, 1, 1, N ── 61
        PRAKIL   M1    ──────────── 64
   L3   I = N
        ......
```

FIG. 8

THIRD EXAMPLE OF OUTPUTS OF INTERMEDIATE CODE 14

```
        ENTRY    SUB
        PARADO   M2, L1  ──────────── 83
        ┌──────────────────────────────┐
        │ INTERMEDIATE CODE CORRESPONDING TO │ ── 81
        │ SOURCE PROGRAM 71 OF FIG. 7        │
        └──────────────────────────────┘

PRAKIL   M2    ──────────── 84
        GOTO     L2    ──────────── 85
   L1
        ┌──────────────────────────────┐
        │ INTERMEDIATE CODE CORRESPONDING TO │ ── 82
        │ SOURCE PROGRAM 72 OF FIG. 7        │
        └──────────────────────────────┘

PRAKIL   M1    ──────────── 84
   L2   RETURN
```

FIG. 7

```
         SUBROUTINE SUB ( A, B, C, D )
         REAL A, B, C, D, E, F
         DO 10 I = 1, 1000
            A = B + C * F
            D = A + E
  10     CONTINUE
         RETURN
         END SUBROUTINE
```
— 71

↓

```
         SUBROUTINE SUB ( A, B, C, D )
         REAL A, B, C, D, E, F, TA, TB, TC, TD
            TA = A
            TB = B
            TC = C                        ─── 73
            TD = D
         DO 10 I = 1, 1000
            TA = TB + TC * F   ─── 74
            TD = TA + E
  10     CONTINUE
            A = TA             ─── 75
            D = TD
         RETURN
         END SUBROUTINE
```
— 72

OPTIMIZING COMPILER WHICH GENERATES MULTIPLE INSTRUCTION STREAMS TO BE EXECUTED IN PARALLEL

BACKGROUND OF THE INVENTION

The present invention relates to compiler systems of electronic computer systems having parallel processors that execute two or more procedures in parallel, and more particularly to a parallel execution system related to the optimization of object programs.

When a plurality of different objects can be produced using a plurality of algorithms for a certain portion of a source program and it cannot be determined beforehand which of the objects can be executed in a minimum time, the compiler selects one of the objects on the basis of an arbitrary criterion or the user is asked to select one of the objects with an optional directive. However, problems exist in that objects produced by the conventional techniques sometimes cannot be executed with optimal algorithms.

It is therefore an object of the present invention to provide a parallel execution system which will execute in all cases by using the optimal algorithm.

SUMMARY OF THE INVENTION

According to the present invention, a parallel execution system is provided in regards to a compiler which produces and supplies an object program from a given source program to an electronic computer system.

In the computer system with parallel processors capable of executing two or more procedures in parallel, the compiler is comprised of: a syntax analysis unit for interpreting the statement of the source program and translating into the intermediate code; an optimization unit for optimizing the use of the parallel processors at the level of intermediate codes, including an automatic parallelization unit for identifying parts executable in parallel and performing a conversion of the intermediate code; and a unit for producing the object program.

The automatic parallelization unit is comprised of: a detection unit for detecting and recording the intermediate code corresponding to one part of the source program that is convertible to other different intermediate codes resulting in the same result of calculation but is not possible to determine the one providing the object program which can calculate the result more quickly than the other object programs unless that part of the object programs is executed; and a conversion unit for converting to an intermediate code which adds a different intermediate code resulting in the same result of calculation to the intermediate code detected by the detection unit, executes the original and the added intermediate codes in parallel, stops the execution of the other intermediate codes when the execution of one of the intermediate codes terminates before the other, and executes return to the original execution control.

The computer system may be a computer system having a vector processing processor for executing a vector processing instruction. The optimization unit of the compiler may be comprised of: a vectorization unit for analyzing whether the intermediate code is vectorizable or not and, if vectorizable, converting the vectorizable intermediate code to an intermediate code corresponding to a vector instruction; a detection unit for detecting a collection of intermediate codes which is determined as being vectorizable by the vectorization unit, said collection of intermediate codes being convertible to the intermediate codes corresponding to vector instructions in which priority is given to the vector length thereof or the intermediate codes corresponding vector instructions in which priority is given to the vector continuity thereof but is not possible to determine the one as providing the object program which can calculate its result more quickly than others; and a conversion means for converting to a second intermediate code which executes the intermediate codes vectorized by handling the vector length thereof preferentially and the intermediate codes vectorized by handling the vector continuity thereof preferentially in parallel, stops the execution of the other when the result is obtained from the one of the intermediate codes before the other, and executes return to the original execution control.

In the computer system having a vector processing processor for executing a vector processing instruction, another optimization unit of the compiler may be comprised of: a vectorization unit for analyzing whether the intermediate code is vectorizable or not and, if vectorizable, converting the vectorizable intermediate code to an intermediate code corresponding to a vector instruction; a detection unit for detecting a collection of intermediate codes determined as being vectorizable by the vectorization unit but is not possible to determine whether the vectorized or the unvectorized intermediate code provides the object program which can calculate its result more quickly than others; and a conversion unit for converting to a second intermediate code which executes the vectorized and the unvectorized intermediate codes in parallel, stops the execution of the other when the result is obtained from the one of the intermediate codes before the other, and executes return to the original execution control.

In regards to a subprogram, an optimization unit of the compiler may be comprised of: a detection unit for detecting the intermediate code indicating the start of a subprogram; and a conversion unit for converting to the intermediate code which adds a different intermediate code to the intermediate code of the whole subprogram detected by the detection unit, the different intermediate code storing the values of the corresponding actual arguments in an area allocated to dummy arguments immediately before the subprogram is executed, the allocated area thereafter used for the access and the definition of dummy arguments, and returning from the area to the corresponding actual argument the values of dummy arguments that may have been defined in the subprogram immediately before the subprogram is terminated, executes the original and the added intermediate codes in parallel, and stops the execution of the other intermediate code when the execution of one of the intermediate codes terminates before the other.

The above and other objects and advantages of the present invention will be understood from the following description of preferred embodiments of the present invention when taken in conjunction with the accompanying drawings.

BRIEF DESCRIPTION OF THE DRAWINGS

FIG. 3 shows the intermediate code used to illustrate the present invention.

FIG. 4 illustrates the source program of the present invention.

FIG. 5 illustrates the intermediate code output in the second embodiment of the present invention.

FIG. 6 illustrates the intermediate code output in the third embodiment of the present invention.

FIG. 7 illustrates the subprogram output example used in the fourth embodiment of the present invention.

FIG. 8 illustrates the intermediate code output example in the fourth embodiment of the present invention.

DETAILED DESCRIPTION

One embodiment of a FORTRAN compiler according to the present invention will be described in detail with reference to the drawings.

Figure 2:
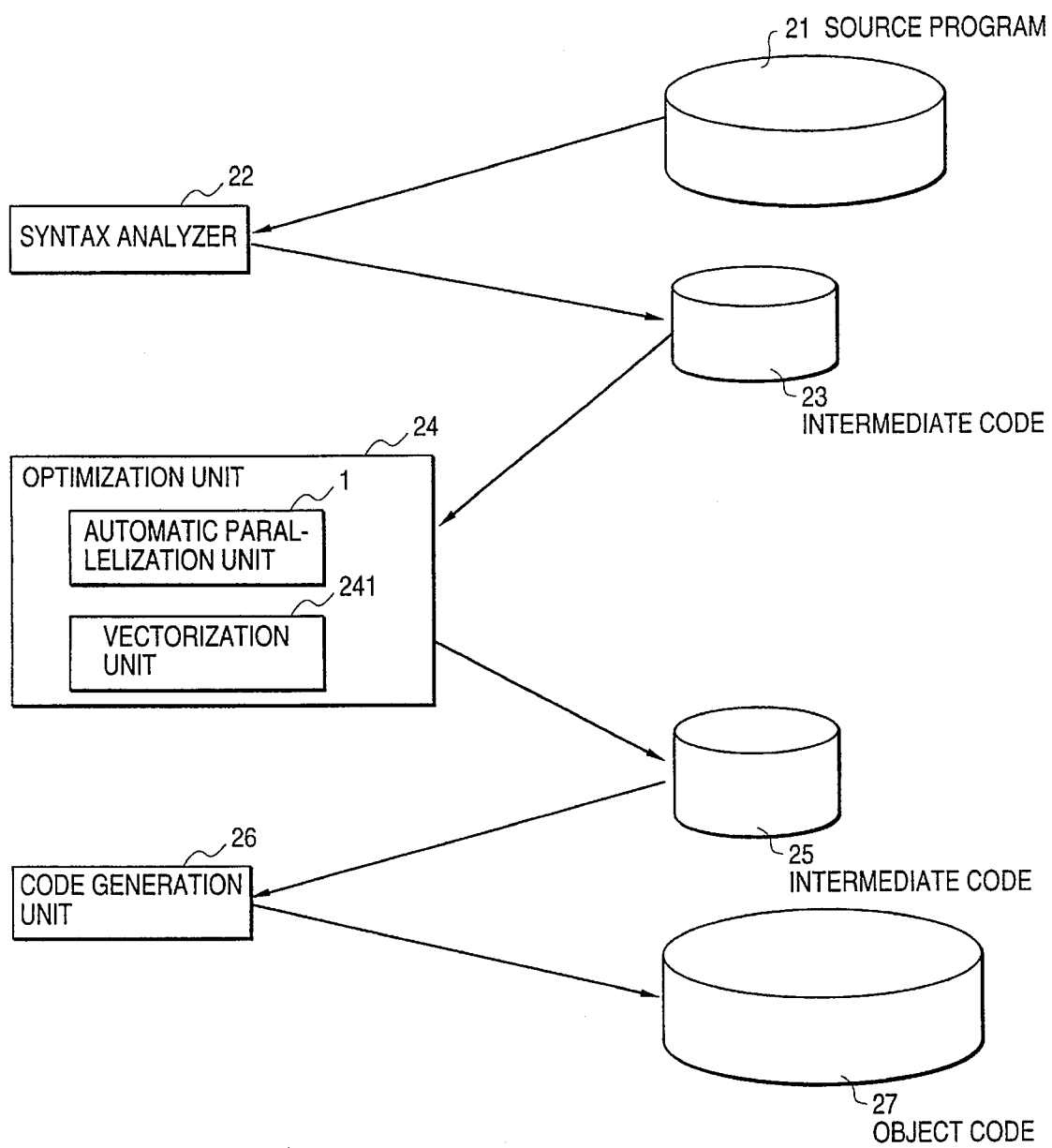
FIG. 2 shows the overall structure of the compiler to which the present invention is applied.

FIG. 2 shows the overall structure of the compiler to which the present invention is applied. In FIG. 2, a syntax analyzer 22 converts a source program 21 which is a FORTRAN program to an intermediate code 25. An optimizing unit 24 will take this as input and performs optimization, vectorization and parallelization, and converts it into an intermediate code 25, using a vectorizing unit 241 and an automatic parallelization unit 1. Then, a code producing unit 26 produces an object code 27. The present invention relates to the automatic parallelization unit I which increases the execution efficiency of the object code 27. The operation of the part of the optimizing unit 24, which pertains to the present invention will be described hereinafter.

Figure 1:
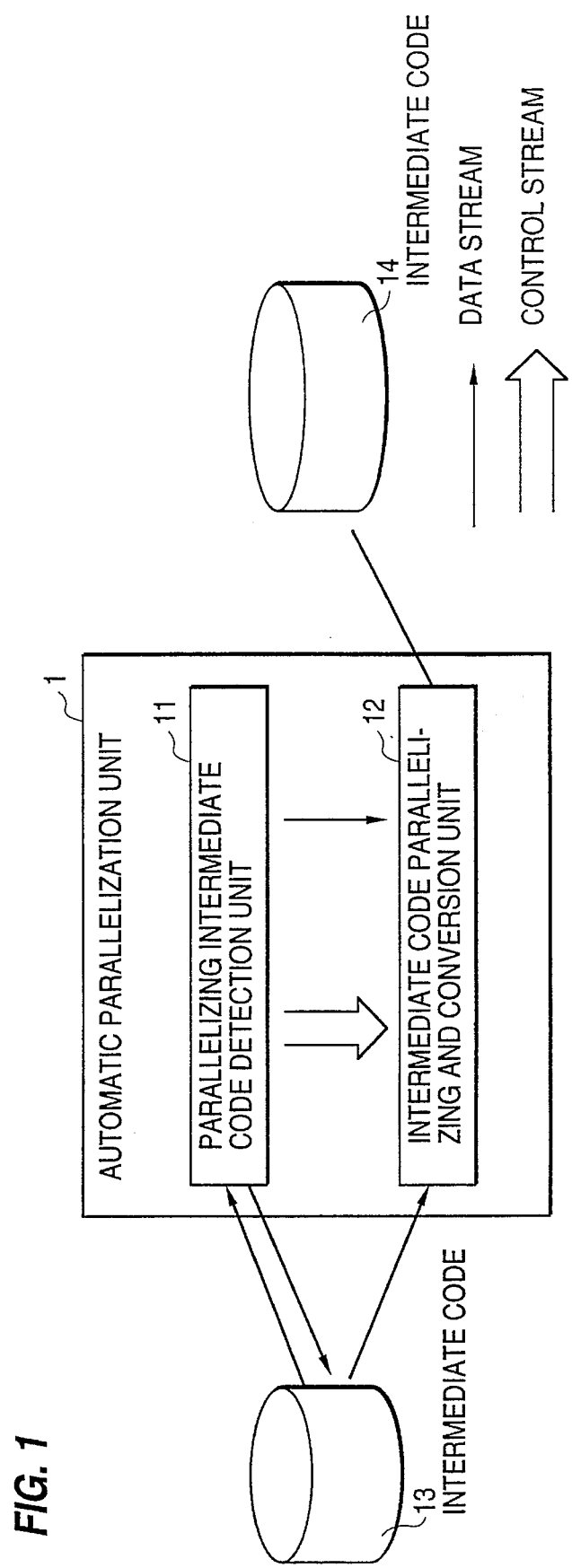
FIG. 1 is a schematic of the parallel execution system used in the explanation of one embodiment of the present invention.

FIG. 1 is a schematic of the parallel execution system as one embodiment of the present invention. In FIG. 1, a parallelizing intermediate code detection unit 11 is a detector which detects a collection of intermediate codes which corresponds to a part of a source program which is convertible to other intermediate codes that bring about the same result of calculation but cannot be determined as bringing about the object program from one of the intermediate codes which can calculate the result more quickly than the others unless that part of the object program is executed. An intermediate code parallelizing and conversion unit 12 adds a different collection of intermediate codes which brings about the same result of calculation to the original collection of intermediate codes detected by the parallelizing intermediate code detection unit 11, executes the original and added intermediate codes in parallel, and converts the intermediate codes to such that when the result is obtained from one of the original and added intermediate codes, the execution of the other is stopped. The intermediate codes 13 and 14 correspond to the temporary intermediate codes converted from the intermediate code 23 to the intermediate code 25 by the optimizing unit 24.

FIG. 3 shows an example of the intermediate code used to describe the invention. In FIG. 3, the intermediate code 31 is an intermediate code which instructs another processor M to execute intermediate codes from the one with the label L. The intermediate code 32 is an intermediate code which stops the procedure under execution in processor M. The intermediate code 33 is an intermediate code corresponding to the vector instruction by which LA number of elements starting at the FA$^{th}$ element at intervals of every SA number of elements are transferred from the arrangement A to the arrangement B starting at the FB$^{th}$ element at intervals of every SB number of elements. The intermediate code 34 is an intermediate code which means the intermediate codes up to the label L are repeatedly executed H times. The intermediate code 35 is an intermediate code which transfers the execution control to the intermediate code with label L. The intermediate code 36 is an intermediate code which substitutes the contents of A into B. The intermediate code 37 is an intermediate code which describes the entry of a subprogram. The intermediate code 38 is an intermediate code which describes the return of the execution control from a subprogram to the calling program.

FIG. 4 illustrates an example of the source program of the present invention. In FIG. 4, the source program 41 is a FORTRAN program example of the input source program in FIG. 2. The intermediate code 42 is an intermediate code corresponding to the source program 41. The intermediate code 43 is another intermediate code which gives the same result as the intermediate code 42. The source program 44 is a source program corresponding to the intermediate code 43 to illustrate the intermediate code 43. Optimization such as the conversion of the source program 41 to the source program 44 will be referred to as loop interchanging.

FIG. 5 illustrates the intermediate code output in the second embodiment. Generally, a vector instruction is said to be more efficient as the vector length of its operand is longer. However, in a program which is executed in a virtual storage space which handles the auxiliary storage as if it were the main storage, the efficiency of the vector instruction will be reduced if the interval of the vectors is longer even if the operand is longer since the number of times of copying from the auxiliary storage to the main storage increases.

For example, in a FORTRAN source program of the source program 41 of FIG. 4, it is possible in the optimizing unit 24 to convert to an intermediate code such as the intermediate code 42 which has a long vector length and a small number of vector instruction repetitions by interchanging the DO loop, but it cannot actually be determined during compilation time which of the intermediate codes 42 or 4S can calculate the result more quickly.

The parallelizing intermediate code detection unit 11 receives the intermediate code 1S as input and detects and records a loop structure in which a multiple DO loop is interchangeable and both the vector length and the interval of vectors as the result of the interchange increase or decrease respectively. The intermediate code parallelizing and conversion unit 12 converts the recorded intermediate codes to an intermediate code 14 as shown in FIG. 5.

Referring to FIG. 5, the converted intermediate code 14 in the present embodiment includes the intermediate codes 42 and 4S corresponding to the source programs 41 and 44, respectively, of FIG. 4, the intermediate code 51 which executes the intermediate codes 42 and 43 in parallel, the intermediate code 52 which stops the execution of the other intermediate code depending on which one of the intermediate codes 42 and 43 has obtained its result earlier, and the intermediate code 53 which executes subsequent return to the original execution control.

FIG. 6 illustrates the intermediate code outputs in the third embodiment.

When a loop is executed, preparations for the execution are required. As the time required for these preparations are generally longer for the vectorized loop, if the vector length is shorter, vectorization renders the processing speed to be lower. However, if the vector length is sufficiently long, vectorization brings about a higher processing speed. Therefore, there is a vector length at which the vectorized and unvectorized loops require the same execution time. Such a vector length is referred to as the intersecting vector length.

If N>M where N is the vector length and M is the intersecting vector length, the processing speed is higher for a vector instruction. When N cannot be determined during compilation time, it cannot be determined which of the object programs derived from a vectorized or an unvectorized intermediate code will be achieve a higher processing speed.

The parallelizing intermediate code detection unit 11 detects and records the vectorizable portion of the intermediate code detected by the vectorizing unit 241 that is not possible to determine the vector length until the time of execution. The intermediate code parallelizing and conversion unit 12 converts the recorded intermediate code to the intermediate code 14 as shown in FIG. 6.

Referring to FIG. 6, the converted intermediate code in the present embodiment includes the vectorized intermediate code 61, the unvectorized intermediate code 62, the intermediate code 63 which executes these intermediate codes in parallel, the intermediate code 64 which stops the execution of the other intermediate code depending on which one of the intermediate codes 61 and 62 has obtained its result earlier, and the intermediate code 65 which executes subsequent return to the original execution control.

FIG. 7 illustrates the subprogram of the fourth embodiment. Generally, access to the data in contiguous memory locations is obtained more quickly than that in noncontiguous locations. Therefore, when a subprogram is executed, a conversion such as that of FIG. 7 can reduce the processing time.

Referring to FIG. 7, immediately before the subprogram is executed, the statement 73 is inserted such that the values of the corresponding actual arguments are stored in an area allocated to dummy arguments, and as shown in the statement 74, this area is used thereafter for the access and the definition of dummy arguments. Immediately before the subprogram is terminated, the statement 75 is inserted to return from this area to the corresponding actual argument the values of dummy arguments that may have been defined in the subprogram.

However, if the processing time for storage into a temporary area is considered, whether the processing time is reduced or not depends on such things as the number of times the transferred actual arguments and dummy arguments are accessed. Therefore, it cannot be determined whether such a conversion will increase the processing speed unless executed.

The parallelizing intermediate code detection unit 11 detects and records the intermediate code indicating the start of the subprogram. The intermediate code parallelizing and conversion unit 12 performs the conversion to the intermediate code 14 of FIG. 8.

Referring to FIG. 8, the converted intermediate code 14 in the present embodiment includes the intermediate code 83 which executes in parallel the intermediate code 81 corresponding to the source program 71 of FIG. 7 and the intermediate code 82 corresponding to the source program 72 of FIG. 7 in which the conversion performed includes the storage to a temporary area, the intermediate code 84 which stops the execution of the other intermediate code depending on which one of the intermediate codes 81 and 82 has obtained its result earlier, and the intermediate code 85 which executes subsequent return to the original execution control.

In the conventional techniques, if the production of an object could be considered using a plurality of algorithms for a certain type of procedures, the algorithm which produces the optimal object could not be determined unless all the objects produced either by using a plurality of compilers or by changing the compilation option were executed.

According to the present invention, by producing a plurality of different objects for a certain part of the source program and executing them in parallel, it becomes possible to use the superior and excellent object as a result and has the effect of reducing the time required for program execution.

It is to be understood that the above-described arrangement is simply illustrative of the invention. Other arrangements may be devised by those skilled in the art which will embody the principles of the invention and fall within the spirit and scope thereof.

What is claimed is:

1. A compiling system for a parallel execution computer system which produces an object program from a given source program and supplies said object program to said parallel execution computer system, said compiling system comprising:

(a) syntax analysis means for receiving said source program, interpreting said source program and translating said source program into a first intermediate code;

(b) detection means for receiving said first intermediate code and detecting a portion of said first intermediate code which may be implemented by a different code which generates a same result as said portion;

(c) parallelizing means for adding to said first intermediate code said different code for producing a composite intermediate code;

(d) conversion means for receiving said composite intermediate code and modifying said composite intermediate code into a second intermediate code to allow said portion and said different code to be executed in parallel until either has finished execution; and (e) object program generating means for generating said object program from said second intermediate code.

2. A compiling system for a parallel execution computer system as set forth in claim 1 wherein if said first intermediate code comprises a calling program and a subprogram having an argument list then said different code includes instructions to store values of said argument list into corresponding dummy arguments, to execute said subprogram using said dummy arguments, and to return said argument list to said calling program after storing in said argument list corresponding values of dummy arguments.

3. A computer-implemented method for generating an object program for execution in a parallel execution computer system comprising the steps of:

(a) providing a source program to be compiled and executed;

(b) interpreting said source program and translating into a first intermediate code;

(c) detecting a portion of first intermediate code which may be implemented by a different code which generates a same result as said portion;

(d) adding to said first intermediate code said different code for producing a composite intermediate code;

(e) modifying said composite intermediate code into a second intermediate code to allow said portion and said different code to be executed in parallel until either has finished execution; and (f) generating said object program from said second intermediate code.

4. A computer-implemented method for generating an object program for execution in a parallel execution computer system as set forth in claim 3 wherein if said first intermediate code comprises a calling program and a subprogram having an argument list then said different code includes instructions to store values of said argument list into corresponding dummy arguments, to execute said subprogram using said dummy arguments, and to return said argument list to said calling program after storing in said argument list corresponding values of dummy arguments.

* * * * *